United States Patent
Lee

(10) Patent No.: US 6,752,139 B2
(45) Date of Patent: Jun. 22, 2004

(54) WORKTABLE FOR CUTTING MACHINE

(76) Inventor: Wy Peron Lee, 11614 Sterling Ave., Suite 103, Riverside, CA (US) 92503

( * ) Notice: Subject to any disclaimer, the term of this patent is extended or adjusted under 35 U.S.C. 154(b) by 123 days.

(21) Appl. No.: 10/217,763

(22) Filed: Aug. 13, 2002

(65) Prior Publication Data

US 2004/0031365 A1 Feb. 19, 2004

(51) Int. Cl.$^7$ ................................................ B28D 7/04
(52) U.S. Cl. ........................................ 125/12; 125/35
(58) Field of Search ................ 125/12, 35; 83/401, 83/437.1

(56) References Cited

U.S. PATENT DOCUMENTS

| | | | | |
|---|---|---|---|---|
| 2,890,693 A | * | 6/1959 | Evans | 125/35 |
| 3,735,660 A | * | 5/1973 | Pearl | 83/560 |
| 4,662,258 A | * | 5/1987 | Mood | 83/455 |
| 4,940,038 A | * | 7/1990 | O'Keefe | 125/13.01 |
| 4,991,354 A | * | 2/1991 | Schweickhardt | 451/188 |
| 5,322,001 A | * | 6/1994 | Boda | 83/485 |
| 5,524,515 A | * | 6/1996 | Boda | 83/455 |
| 5,676,124 A | * | 10/1997 | Lee | 125/13.01 |
| 5,996,459 A | * | 12/1999 | Cornell et al. | 83/485 |
| 6,119,676 A | * | 9/2000 | Greenland | 125/35 |
| 6,272,961 B1 | * | 8/2001 | Lee | 83/581 |
| 6,283,110 B1 | * | 9/2001 | Lee | 125/13.01 |
| 6,314,893 B1 | * | 11/2001 | Lee | 108/119 |
| 6,347,624 B1 | * | 2/2002 | Smith et al. | 125/13.01 |
| 6,427,677 B1 | * | 8/2002 | O'Banion | 125/23.02 |
| 6,460,443 B1 | * | 10/2002 | Hsiao | 83/614 |
| 6,508,244 B2 | * | 1/2003 | Lee | 125/12 |
| 6,672,188 B2 | * | 1/2004 | Lee | 83/168 |

* cited by examiner

*Primary Examiner*—M. Rachuba
(74) *Attorney, Agent, or Firm*—Raymond Y. Chan; David and Raymond Patent Group

(57) ABSTRACT

A worktable, which is incorporated with a cutting machine, includes a table body and a cutting end support. The table body has at least a guiding rail formed on an upper surface for guiding a cutting pathway of a saw blade wherein the guiding rail has an opening end portion extended from an edge of the table body. The cutting end support is mounted on the table body at the opening end portion of the guiding rail. The saw blade is adapted to cut through the cutting end support to form a cutting groove when the saw blade is suspendedly slid along the opening end portion of the guiding rail. Therefore, a bottom side of an edge portion of the work piece is substantially supported by the cutting end support when the saw blade cuts the edge portion of the work piece through the cutting groove.

20 Claims, 8 Drawing Sheets

WORKTABLE FOR CUTTING MACHINE

BACKGROUND OF THE PRESENT INVENTION

1. Field of Invention

The present invention relates to a cutting machine, and more particularly to a worktable for a cutting machine, wherein the worktable comprises a cutting end support provided on an end portion of a guiding rail to support a work piece so as to enhance the quality of cutting work.

2. Description of Related Arts

Referring to FIG. 1A, a conventional worktable comprises a table body having a working surface for placing a work piece thereon and at least a guiding rail indented on the working surface, and a guiding member, having an opening, mounted on an edge of the table body wherein the guiding rail is extended to the opening of the guiding member in such a manner that when the work piece is placed on the working surface of the table body, a corner portion of the work piece is positioned at the opening of the guiding member in a suspended manner, as shown in FIG. 1B.

Accordingly, a cutting machine, which is arranged to support on the table body, comprises a saw blade rotatably supported over the table body wherein the work piece on the table body is cut or shaped by the saw blade along the guiding rail. However, the conventional work body has several drawbacks.

When the saw blade starts to cut the work piece along the guiding rail, the saw blade can precisely cut on the work piece because the bottom portion of the work piece is supported on the working surface of the table body. However, when the saw blade is slid out of the guiding rail to finish cutting the corner portion of the work piece, the corner portion of the work piece may crack. Since the corner portion of the work piece has no support with respect to the worktable, the rotational cutting force of the saw blade will exert on the work piece. Therefore, the corner portion of the work piece, which is relatively fragile, will be easily cracked. Since the work piece, such as ceramic tile, marble or natural stone, is expensive, a little crack portion of the work piece may be useless or must be thrown away. Otherwise, the user must repair the cracked work piece by filing the crack thereof, so as to highly increase the manufacturing cost of the work piece.

Moreover, the worktable is usually made of stiffness material, such as steel, that provides less friction between the working surface and a bottom surface of the work piece. Therefore, when the work piece is placed on the working surface of the table body, the work piece may have an intention to unavoidably slide on the working surface by the cutting force of the saw blade so as to provide an inaccurate cutting work.

SUMMARY OF THE PRESENT INVENTION

A main object of the present invention is to provide a worktable for a cutting machine, wherein the worktable comprises a cutting end support provided on an end portion of a guiding rail to support a work piece so as to enhance the quality of cutting work.

Another object of the present invention is to provide a worktable for a cutting machine, wherein the cutting end support is extended from the end portion of the guiding rail to form a reinforcing layer that covers on a table body of the worktable and provides an anti-skidding working surface which can prevent an unwanted sliding movement of the work piece when the work piece is placed on the working surface during the cutting process.

Another object of the present invention is to provide a worktable for a cutting machine, wherein the cutting end support is capable of being cut by a saw blade of the cutting machine to form a cutting groove in such a manner that when a corner portion of the work piece is substantially supported on the cutting end support of the supporting member the cutting end support ensures the cutting alignment of the work piece when the saw blade is slid through the cutting groove.

Another object of the present invention is to provide a worktable for a cutting machine, wherein since the cutting groove must be formed by the saw blade cutting through the cutting end support, the cutting groove, having a width slightly larger than a thickness of the saw blade, is mechanically fitted for the corresponding saw blade slidably passing through.

Another object of the present invention is to provide a worktable for a cutting machine, wherein the cutting end support is an integral one-piece body provided at the end portion of the guiding rail before the cutting groove is formed. In other words, the cutting end support functions as a manufacture warrantee to ensure the cutting machine is brand new and no one use it before when the cutting groove is not formed on the cutting end support yet.

Another object of the present invention is to provide a worktable for a cutting machine, wherein no expensive or complicated part is required to employ in the present invention and the worktable does not require to altering its original structural design, so as to minimize the manufacturing cost of the worktable.

Accordingly, in order to accomplish the above objects, the present invention provides a worktable for a cutting machine which comprises a saw blade rotatably supported over the worktable, wherein the worktable comprises:

a table body having an upper surface and at least a guiding rail formed on the upper surface wherein the guiding rail, having an opening end portion extended from an edge of the table body, is adapted for guiding a cutting pathway of the saw blade when the saw blade is suspendedly slid along the guiding rail on the table body; and a cutting end support mounted on the table body at the opening end portion of the guiding rail wherein the cutting end support is adapted for supporting an edge portion of a work piece when the work piece is placed on the table body;

whereby, the saw blade is arranged to cut through the cutting end support to form a cutting groove when the saw blade is suspendedly slid along the opening end portion of the guiding rail in such a manner that a bottom side of the edge portion of the work piece is substantially supported by the cutting end support when the saw blade cuts the edge portion of the work piece through the cutting groove.

Alternatively, the present invention provides a worktable for a cutting machine which comprises a saw blade rotatably supported over the worktable, wherein the worktable comprises:

a table body having an upper surface and at least a guiding rail formed on the upper surface wherein the guiding rail, having an opening end portion extended from an edge of the table body, is adapted for guiding a cutting pathway of the saw blade when the saw blade is suspendedly slid along the guiding rail on the table body; and a cutting end support which is mounted on the table body at the opening end portion of the guiding rail and has a cutting groove having a width slightly larger than a thickness of the saw blade, wherein the cutting end support is adapted for substantially supporting an edge portion of a work piece when the work piece is placed on the table body such that the saw blade is arranged to slidably cut the edge portion of the work piece along the cutting groove.

BRIEF DESCRIPTION OF THE DRAWINGS

FIG. 4 is a sectional view of the worktable for the cutting machine according to the above preferred embodiment of the present invention, illustrating an edge portion of a work piece being supported on the cutting end support while a saw blade is slidably cutting through.

DETAILED DESCRIPTION OF THE PREFERRED EMBODIMENT

Figure 2:
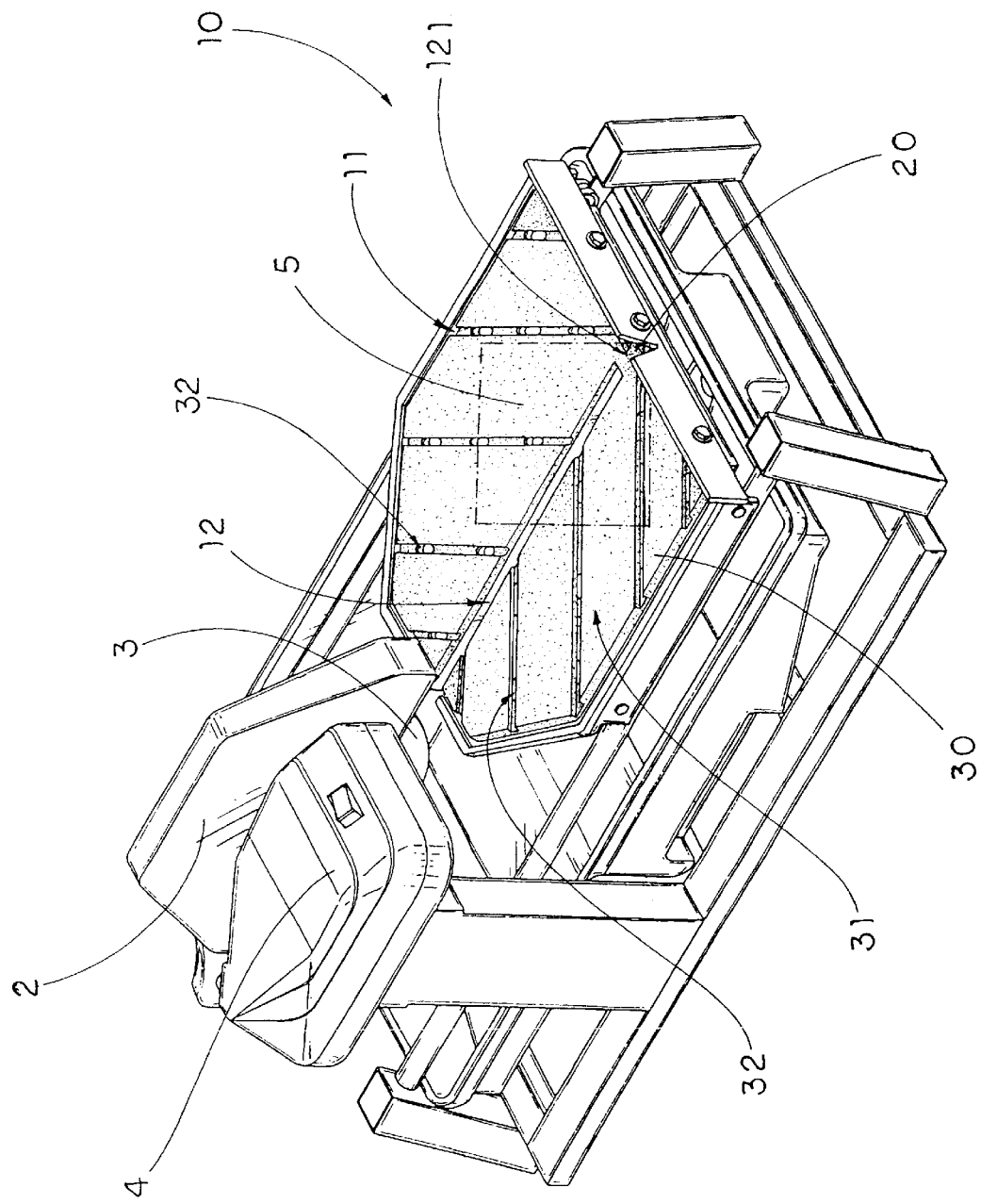
FIG. 2 is a perspective view of a cutting machine mounted on a worktable according to a preferred embodiment of the present invention.
Figure 3:
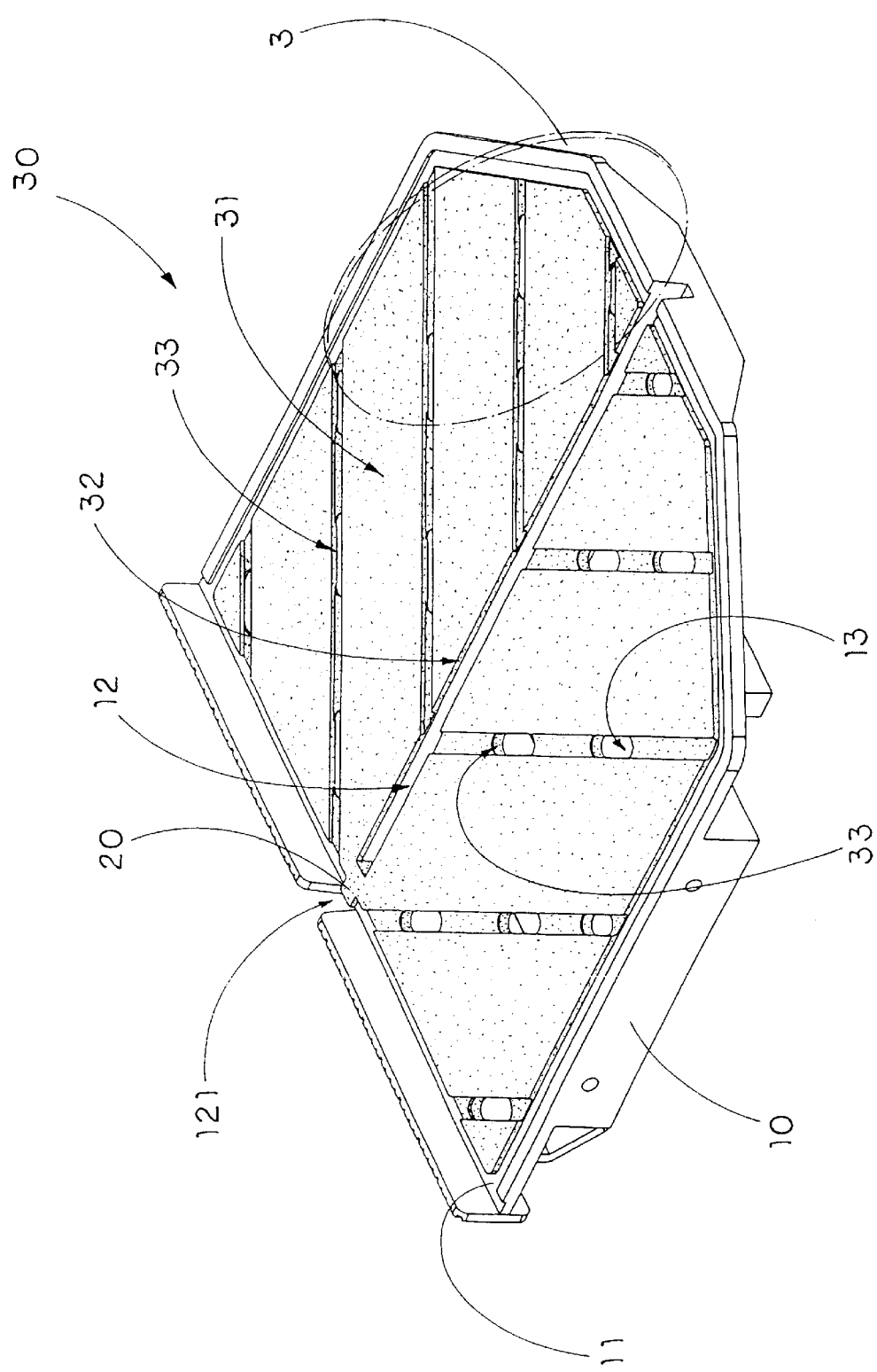
FIG. 3 is a perspective view of the worktable for the cutting machine according to the above preferred embodiment of the present invention.

Referring to FIGS. 2 and 3 of the drawings, a worktable for a cutting machine according to a preferred embodiment of the present invention is illustrated, wherein the cutting machine 1, such as a conventional power saw, comprises a cutting head 2 overhanging the work table with a circular a saw blade 3 rotatably supported over the worktable and powered by a motor 4.

The worktable comprises a table body 10 having an upper surface 11 and at least a guiding rail 12 formed on the upper surface 11 wherein the guiding rail 12, having an opening end portion 121 extended from an edge of the table body 10, is adapted for guiding a cutting pathway of the saw blade 3 when the saw blade 3 is suspendedly slid along the guiding rail 12 on the table body 10.

The worktable further comprises a cutting end support 20 mounted on the table body 10 at the opening end portion 121 of the guiding rail 12 wherein the cutting end support 20 is adapted for supporting an edge portion of a work piece 5 when the work piece 5 is placed on the table body 10.

Figure 4:
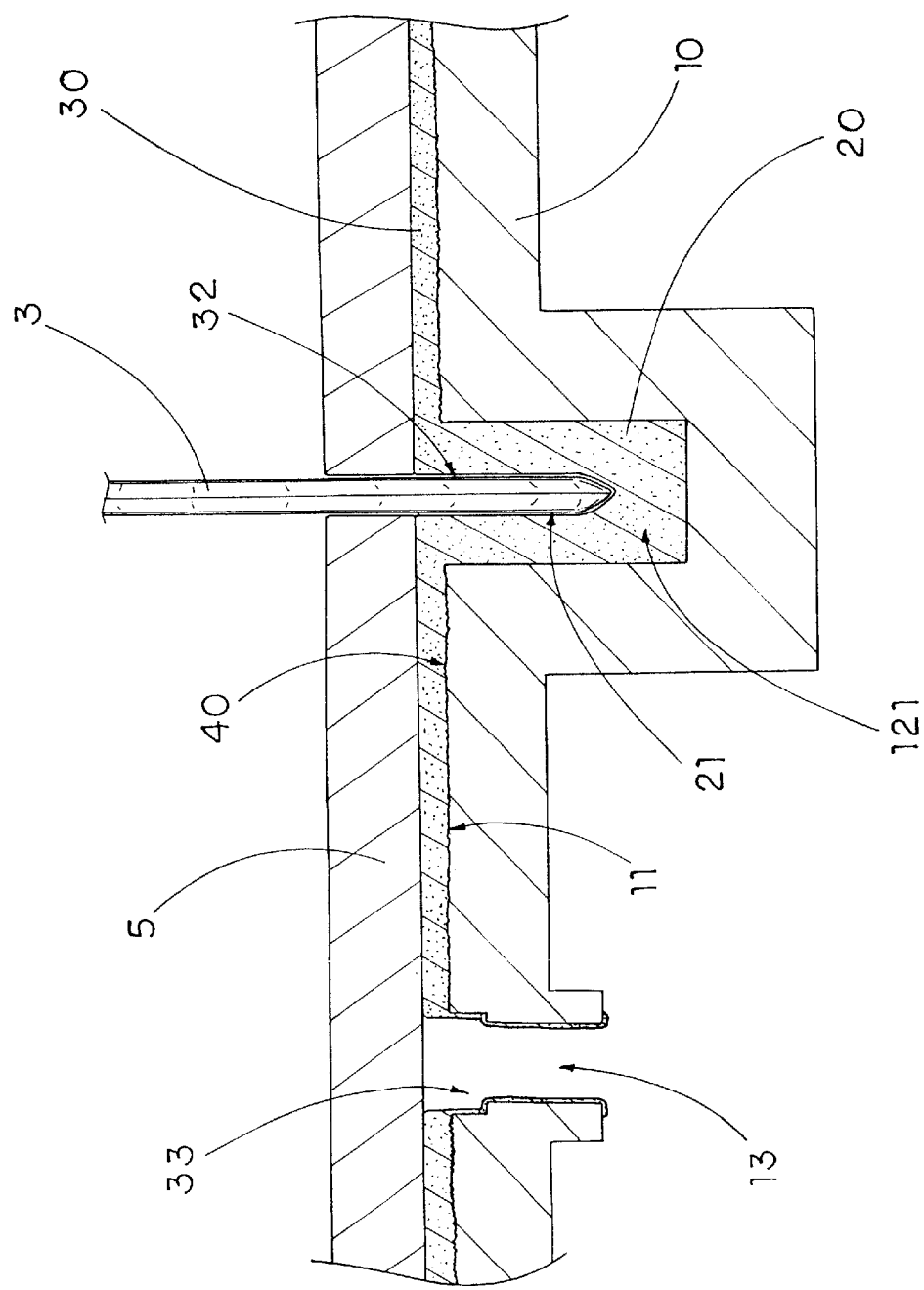

As shown in FIG. 4, the saw blade 3 is arranged to cut through the cutting end support 20 to form a cutting groove 21 when the saw blade 3 is suspendedly slid along the opening end portion 121 of the guiding rail 12 in such a manner that a bottom side of the edge portion of the work piece 5 is substantially supported by the cutting end support 20 when the saw blade 3 cuts the edge portion, such as a corner edge portion, of the work piece 5 through the cutting groove 21.

According to the preferred embodiment, the table body 10 is made of stiffness material such as steel so that the table body 10 is adapted for rigidly supporting the cutting machine 1 thereon. The guiding rail 12 is indented on the upper surface 11 of the table body 10 wherein the opening end portion 121 of the guiding rail 12 is extended from one edge of the table body 10 towards another edge thereof, in such a manner that an outer circumferential portion of the saw blade 3 is positioned within the guiding rail 12 to cut the work piece 5 when the work piece 5 is supported on the table body 10. Moreover, the saw blade 3 is slid out of the guiding rail 12 at the opening end portion 121 thereof to finish the cutting of the work piece 5.

The cutting end support 20 is securely mounted on the opening end portion 121 of the guiding rail 12 to seal the opening end portion 121 thereof. The cutting end support 20 is made of elastic material such as rubber or foaming material such that the saw blade 3 is adapted to cut through the cutting end support 20 to form the cutting groove 21. Moreover, the cutting end support 20 is capable of absorbing a rotational cutting force exerted on the work piece 5 such that when the saw blade 3 cuts through the end portion of the work piece 5, the cutting end support 20 not only supports the end portion of the work piece 5 but also distributes the rotational cutting force so as to prevent the end portion of the work piece 5 from being cracked by the rotational cutting force.

Accordingly, the cutting groove 21 has a width slightly larger than a thickness of the saw blade 3 in such a manner that the saw blade 3 is capable of slidably passing through the cutting groove 21 so as to slide out of the opening end portion 121 of the guiding rail 12 to finish the cutting of the work piece 5.

As shown in FIG. 4, the cutting end support 20 has a width at least equal to a width of the guiding rail 12 in such a manner that two outer sidewalls of the cutting end support 20 are rigidly mounted on two inner sidewalls of the guiding rail 12 respectively. Therefore, when the saw blade 5 is slid to cut through the cutting end support 20, the cutting end support 20 is securely held at the opening end portion 121 of the guiding rail 12 in position, so as to prevent the saw blade 5 misaligning with the cutting groove 21.

Preferably, the cutting end support 20 is an integral one-piece solid body mounted to the guiding rail 12 such that there is no cutting groove 21 is formed on the cutting end support 20 before the use of the cutting machine 1. In other words, the cutting end support 20 functions as a manufacture seal to ensure the brand new worktable. Therefore, once the cutting groove 21 is formed on the cutting end support 20, it implies that the worktable has been used.

It is worth mentioning that since the cutting groove 21 is formed by the saw blade 3 cutting through the cutting end support 20, the size of the cutting groove 21 is mechanically fitted for the corresponding saw blade 3. In other words, during the cutting process, the work piece 5 is cut by the saw blade 5 while the saw blade 5 is fittedly passed through the cutting groove 21.

The worktable further comprises a reinforcing layer 30 integrally extended from the cutting end support 20 to cover on the upper surface 11 of the table body 10, wherein the reinforcing layer 30 has an anti-skidding working surface 31 for supporting the work piece 5 thereon. The reinforcing layer 30 is preferably made of rubber or foaming material such that the reinforcing layer 30 is adapted to enhance a friction between the working surface 31 and the bottom side of the work piece 5, so as to prevent an unwanted sliding movement of the work piece 5 with respect to the table body 10 during cutting process.

Figure 1A:
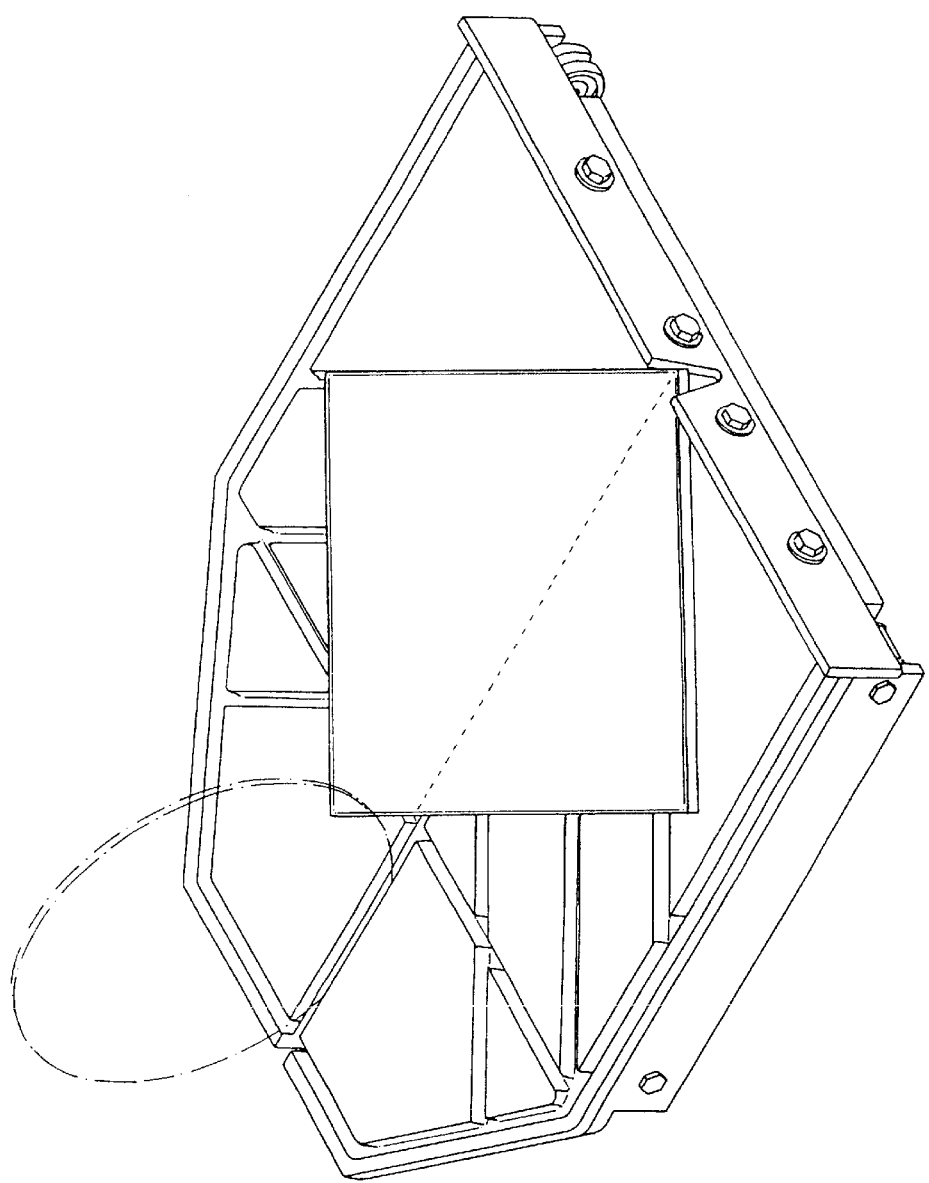
FIG. 1A is a perspective view of a conventional worktable for a cutting machine.
Figure 1B:
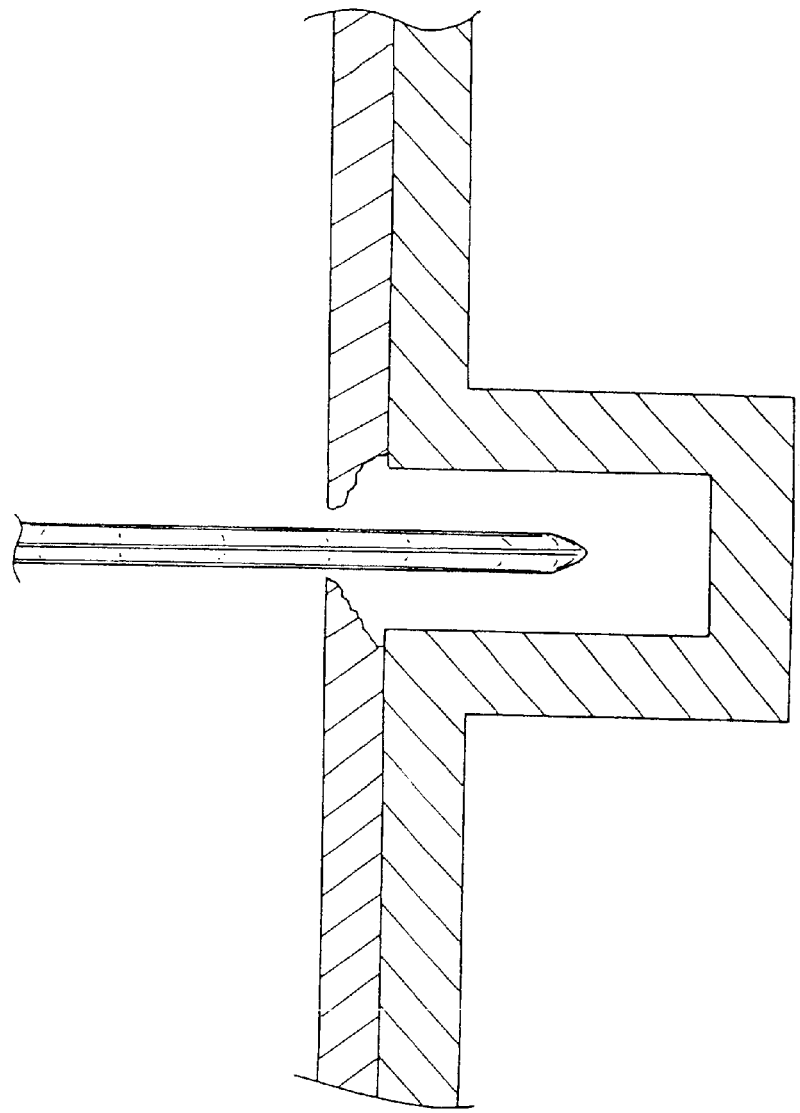
FIG. 1B is a sectional view of the worktable for the cutting machine, illustrating the end portion of the work piece being suspendedly supported on the guiding rail of the table body.

As shown in FIG. 1, the reinforcing layer 30 has at least a guider slot 32 formed on the working surface 31 wherein the guider slot 32 is aligned with the guiding rail 12 to communicate the working surface 31 with the guiding rail 12 in such a manner that the cutting end support 20 is integrally mounted at an end portion of the guider slot 32 so as to further hold the cutting end support 20 in position. Therefore, the saw blade 3 is adapted to extend to the guiding rail 12 of the table body 10 through the guider slot 32 of the reinforcing layer 30.

Figure 5:
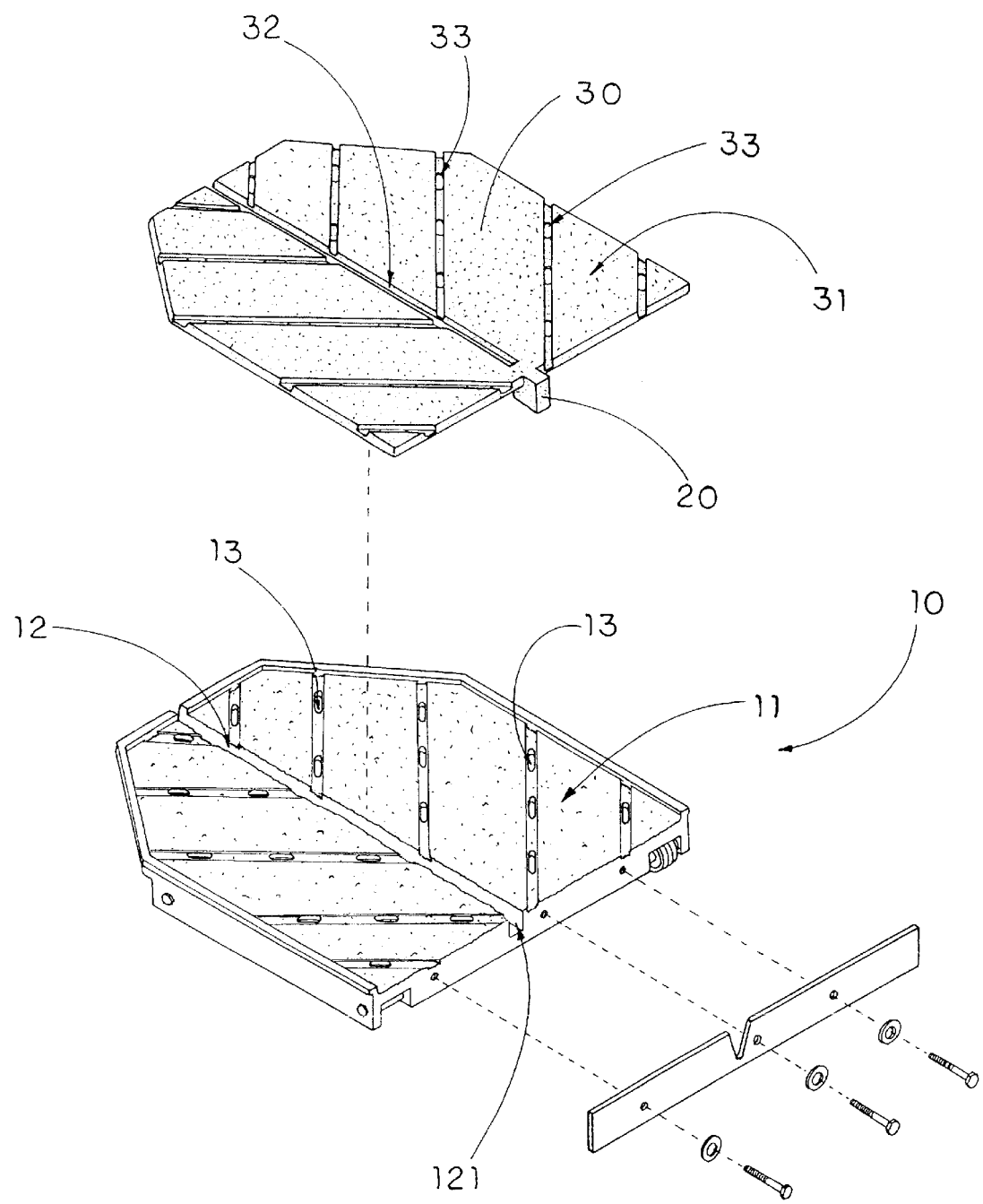
FIG. 5 is an exploded perspective view of the worktable for the cutting machine according to the above preferred embodiment of the present invention, illustrating an attachment between the guiding layer and the table body.

Since the table body 10 and the reinforcing layer 30 are made of different materials, the worktable further comprises an adhesive layer 40 to securely bond the reinforcing layer 30 on the table body 10. As shown in FIGS. 4 and 5, the upper surface 11 of the table body 10 is constructed to have a rough surface wherein the adhesive layer 40 is applied on the upper surface 11 of the table body 10 to securely attach the bottom surface of the reinforcing layer 30.

Accordingly, the adhesive layer 40 is capable of substantially bonding the reinforcing layer 30 on the table body 10 wherein the reinforcing layer 30 is coated on the upper surface 11 of the table body 10 by injection molding such that the reinforcing layer 30 is integrally formed on the upper surface 11 of the table body 10. Moreover, the rough upper surface 11 of the table body 10 can substantially increase the friction and the contacting area with respect to the reinforcing layer 30 so as to ensure the secure attachment between the table body 10 and the reinforcing layer 30.

As shown in FIGS. 3 and 5, the table body 10 further has a plurality of collecting holes 13 formed on the upper surface 11 of the table body 10 for sawdust of the work piece 5 passing through. The reinforcing layer 30 further has a plurality of passages 33 indented on the working surface 31 of the reinforcing layer 30 to communicate with the collecting holes 13 respectively in such a manner that while cutting the work piece 5, the sawdust is capable of being flushed away and guided to flow to the collecting holes 13 through the passages 33. Therefore, when a collecting tray is placed underneath the worktable, the sawdust is flushed and collected in the collecting tray through the collecting holes 13.

FIG. 5 illustrates the reinforcing layer 30 is exploded from the table body 10 so as to indicate the rough upper surface 11 of the table body 10. However, when the reinforcing layer 30 is coated on the table body 10, the reinforcing layer 30 is integrally bonded to the upper surface 11 of the table body 10. Therefore, some residues of the reinforcing layer 30 are coated on a surrounding wall of the collecting hole 13 of the table body 10 during coating process, as shown in FIG. 3.

Figure 6A:
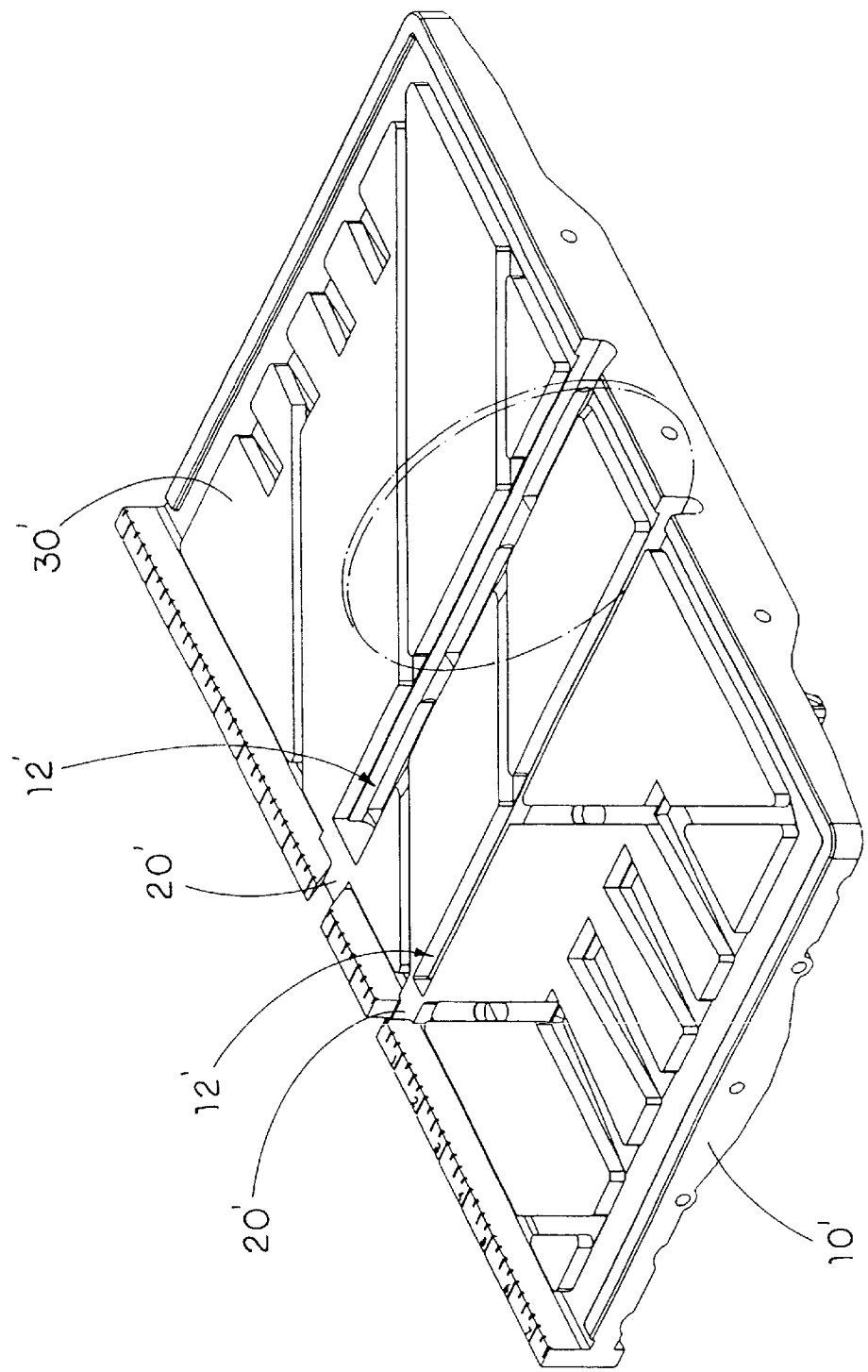
FIGS. 6A and 6B illustrate alternative modes of the worktable according to the above preferred embodiment of the present invention, showing how the cutting end support incorporating with different kinds of the table body.
Figure 6B:
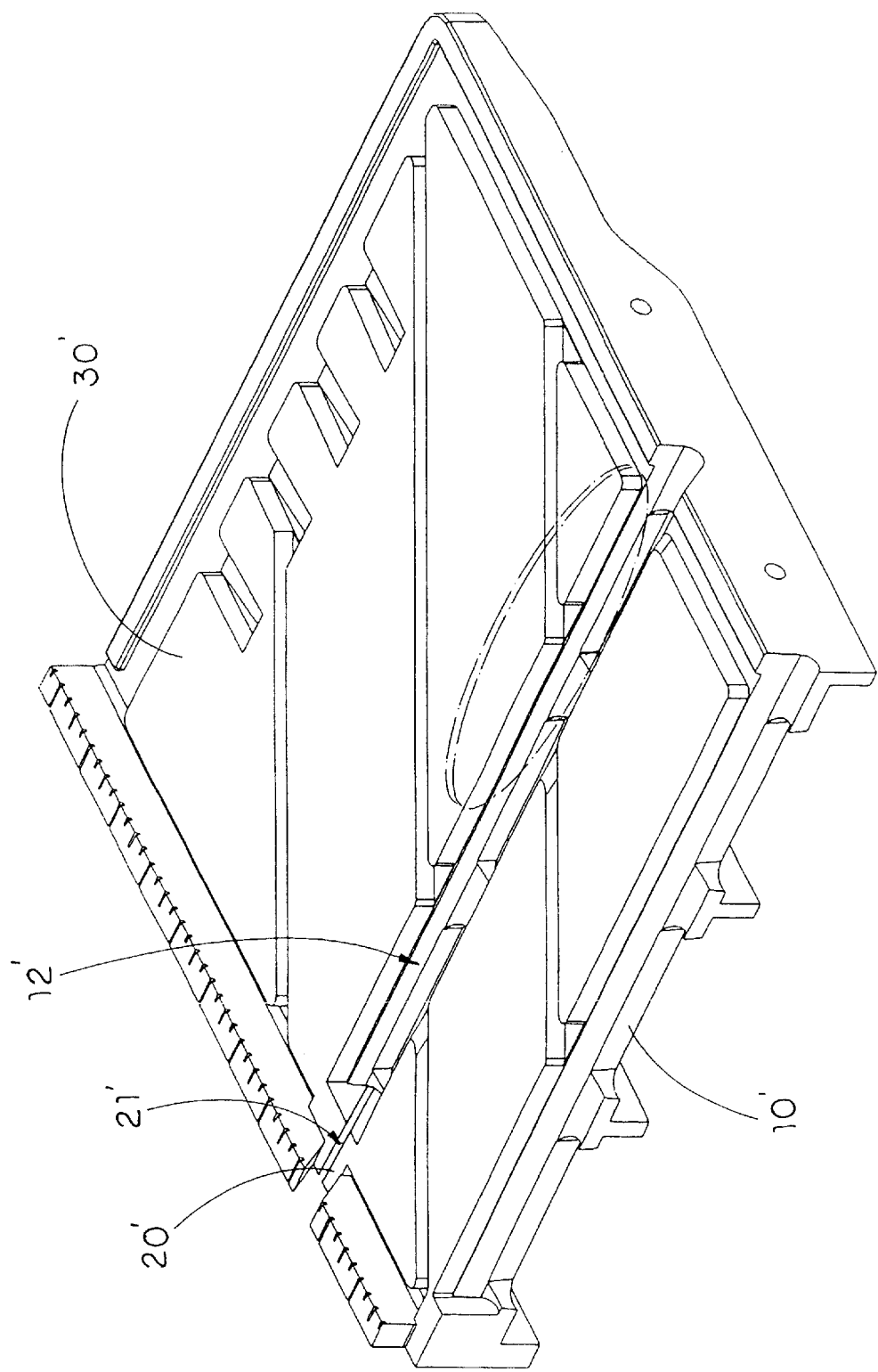

FIGS. 6A and 6B illustrate alternative modes of the worktable wherein the table bodies 10' can be constructed as different shapes and sizes. Moreover, the guiding rail 12' can be formed any position on the table body 10'. In other words, the cutting end support 20' can be mounted on any kind of the table body 10' at the end portion of the guiding rail 12' to substantially support the work piece 5 on the table body 10'.

In addition, the present invention is capable of incorporating with any cutting machine 1 with miter cutting feature that accommodate a cutting work at an angle or a bevel for precision cutting on the work piece 5 since the cutting groove 21' is formed by the saw blade 3 initially cutting through the cutting end support 20'. Furthermore, the reinforcing layer 30' can be adjustably mounted on the table body 10' based on the size and shape of the table body 10'.

It is worth mentioning that the cutting groove 21 can be initially formed on the cutting end support 20 such that no cut is required by the saw blade 3 to cut through the cutting end support 20 to form the cutting groove 21. In other words, the cutting groove 21 is transversely formed on the cutting end support 21 from one side to another side and aligned with the guiding rail 21 for the outer circumferential portion of the saw blade 5 passing through.

In view of the above disclosure of the present invention, the end portion of the work piece 5 is substantially supported by the cutting end support 20 at the end portion of the guiding rail 12 of the table body 10, such that when the saw blade 3 cuts through the end portion of the work piece 5, the rotational cutting force from the saw blade 3 can be substantially distributed to the cutting end support 20 so as to prevent the work piece 5 from being cracked at the end portion thereof.

What is claimed is:

1. A worktable for a cutting machine which comprises a saw blade rotatably supported over said worktable, wherein said worktable comprises:

a table body having an upper surface and at least a guiding rail formed on said upper surface, wherein said guiding rail, having an opening end portion extended from an edge of said table body, is adapted for guiding a cutting pathway of said saw blade when said saw blade is suspendedly slid along said guiding rail on said table body; and a cutting end support mounted on said table body at said opening end portion of said guiding rail wherein said cutting end support is adapted for substantially supporting an edge portion of a work piece when said work piece is placed on said table body;

whereby, the saw blade is arranged to cut through said cutting end support to form a cutting groove when said saw blade is suspendedly slid along said opening end portion of said guiding rail in such a manner that a bottom side of said edge portion of said work piece is substantially supported by said cutting end support when said saw blade cuts said edge portion of said work piece through said cutting groove.

2. The worktable, as recited in claim 1, wherein said cutting end support has a width at least equal to a width of said guiding rail in such a manner that two outer sidewalls of said cutting end support are rigidly mounted on two inner sidewalls of said end portion of said guiding rail respectively.

3. The worktable, as recited in claim 1, further comprising a reinforcing layer integrally extended from said cutting end support to cover on said upper surface of said table body, wherein said reinforcing layer has an anti-skidding working surface for supporting said work piece thereon and at least a guider slot formed on said working surface to align and communicate with said guiding rail.

4. The worktable, as recited in claim 2, further comprising a reinforcing layer integrally extended from said cutting end support to cover on said upper surface of said table body, wherein said reinforcing layer has an anti-skidding working surface for supporting said work piece thereon and at least a guider slot formed on said working surface to align and communicate with said guiding rail.

5. The worktable, as recited in claim 3, further comprising an adhesive layer provided on said upper surface of said table body to securely bond said reinforcing layer on said table body, wherein said upper surface of said table body is constructed to have a rough surface so as to enhance an attachment between said reinforcing layer and said table body.

6. The worktable, as recited in claim 4, further comprising an adhesive layer provided on said upper surface of said table body to securely bond said reinforcing layer on said table body, wherein said upper surface of said table body is constructed to have a rough surface so as to enhance an attachment between said reinforcing layer and said table body.

7. The worktable, as recited in claim 2, wherein said cutting end support is made of rubber that is capable of being cut through by said saw blade to form said cutting groove.

8. The worktable, as recited in claim 4, wherein said cutting end support is made of rubber that is capable of being cut through by said saw blade to form said cutting groove.

9. The worktable, as recited in claim 6, wherein said cutting end support is made of rubber that is capable of being cut through by said saw blade to form said cutting groove.

10. The worktable, as recited in claim 2, wherein said cutting end support is made of foaming material that is capable of being cut through by said saw blade to form said cutting groove.

11. The worktable, as recited in claim 4, wherein said cutting end support is made of foaming material that is capable of being cut through by said saw blade to form said cutting groove.

12. The worktable, as recited in claim 6, wherein said cutting end support is made of foaming material that is capable of being cut through by said saw blade to form said cutting groove.

13. A worktable for a cutting machine which comprises a saw blade rotatably supported over said worktable, wherein said worktable comprises:

a table body having an upper surface and at least a guiding rail formed on said upper surface, wherein said guiding rail, having an opening end portion extended from an edge of said table body, is adapted for guiding a cutting pathway of said saw blade when said saw blade is suspendedly slid along said guiding rail on said table body; and a cutting end support which is mounted on said table body at said opening end portion of said guiding rail and has a cutting groove having a width slightly larger than a thickness of said saw blade, wherein said cutting end support is adapted for substantially supporting an edge portion of a work piece when said work piece is placed on the table body such that said saw blade is arranged to slidably cut said edge portion of said work piece along said cutting groove.

14. The worktable, as recited in claim 13, wherein said cutting end support has a width at least equal to a width of said guiding rail in such a manner that two outer sidewalls of said cutting end support are rigidly mounted on two inner sidewalls of said end portion of said guiding rail respectively.

15. The worktable, as recited in claim 13, further comprising a reinforcing layer integrally extended from said cutting end support to cover on said upper surface of said table body, wherein said reinforcing layer has an anti-skidding working surface for supporting said work piece thereon and at least a guider slot formed on said working surface to align and communicate with said guiding rail.

16. The worktable, as recited in claim 14, further comprising a reinforcing layer integrally extended from said cutting end support to cover on said upper surface of said table body, wherein said reinforcing layer has an anti-skidding working surface for supporting said work piece thereon and at least a guider slot formed on said working surface to align and communicate with said guiding rail.

17. The worktable, as recited in claim 15, further comprising an adhesive layer provided on said upper surface of said table body to securely bond said reinforcing layer on said table body, wherein said upper surface of said table body is constructed to have a rough surface so as to enhance an attachment between said reinforcing layer and said table body.

18. The worktable, as recited in claim 16, further comprising an adhesive layer provided on said upper surface of said table body to securely bond said reinforcing layer on said table body, wherein said upper surface of said table body is constructed to have a rough surface so as to enhance an attachment between said reinforcing layer and said table body.

19. The worktable, as recited in claim 18, wherein said cutting end support is made of rubber.

20. The worktable, as recited in claim 18, wherein said cutting end support is made of foaming material.

* * * * *